US010140508B2

(12) United States Patent
Zhang

(10) Patent No.: US 10,140,508 B2
(45) Date of Patent: Nov. 27, 2018

(54) METHOD AND APPARATUS FOR ANNOTATING A VIDEO STREAM COMPRISING A SEQUENCE OF FRAMES

(71) Applicant: Rui Zhang, Aurora (CA)

(72) Inventor: Rui Zhang, Aurora (CA)

(73) Assignee: HUAWEI TECHNOLOGIES CO. LTD., Shenzhen (CN)

( * ) Notice: Subject to any disclaimer, the term of this patent is extended or adjusted under 35 U.S.C. 154(b) by 0 days.

(21) Appl. No.: 15/248,684

(22) Filed: Aug. 26, 2016

(65) Prior Publication Data

US 2018/0060653 A1   Mar. 1, 2018

(51) Int. Cl.
| | |
|---|---|
| G06K 9/00 | (2006.01) |
| G06K 9/66 | (2006.01) |
| G06T 7/00 | (2017.01) |
| G06T 7/60 | (2017.01) |
| G11B 27/031 | (2006.01) |
| G11B 27/19 | (2006.01) |
| G11B 27/36 | (2006.01) |
| G06T 7/20 | (2017.01) |

(Continued)

(52) U.S. Cl.
CPC ..... *G06K 9/00369* (2013.01); *G06K 9/00718* (2013.01); *G06K 9/00771* (2013.01); *G06K 9/3233* (2013.01); *G06K 9/4628* (2013.01); *G06K 9/627* (2013.01); *G06K 9/6215* (2013.01); *G06K 9/66* (2013.01); *G06T 7/0097* (2013.01); *G06T 7/20* (2013.01); *G06T 7/60* (2013.01); *G11B 27/031* (2013.01); *G11B 27/19* (2013.01); *G11B 27/36* (2013.01); *G06K 9/00744* (2013.01)

(58) Field of Classification Search
CPC ............ G06K 9/00369; G06K 9/00744; G06K 9/00771; G06K 9/66; G06T 7/60; G06T 7/97; G11B 27/031; G11B 27/19; G11B 27/36
USPC .......... 386/278, 282; 348/143–161; 382/103, 382/181, 155
See application file for complete search history.

(56) References Cited

U.S. PATENT DOCUMENTS 7,602,944 B2 * 10/2009 Campbell .......... G06K 9/00778 375/240
8,649,613 B1 *  2/2014 Leung ................ G06K 9/00724 382/155

(Continued)

FOREIGN PATENT DOCUMENTS

| CN | 103440668 A | 12/2013 |
| CN | 104217225 A | 12/2014 |

OTHER PUBLICATIONS

Wang, T., Gong, S., Zhu, X. and Wang, S., Sep. 2014, Person re-identification by video ranking. In European Conference on Computer Vision (pp. 688-703). Springer, Cham.

(Continued)

*Primary Examiner* — Thai Q Tran
*Assistant Examiner* — Stephen R Smith
(74) *Attorney, Agent, or Firm* — Norton Rose Fulbright Canada LLP; Niall Cooney

(57) ABSTRACT

Systems and methods are disclosed herein for annotating video tracks obtained from video data streams. Video tracks are treated as positive if they contain at least one region of interest containing a particular person, and negative if the video track does not contain a region of interest containing the particular person. Visual similarity models are trained using the positive bags.

24 Claims, 13 Drawing Sheets

(51) Int. Cl.
  *G06K 9/32* (2006.01)
  *G06K 9/46* (2006.01)
  *G06K 9/62* (2006.01)

(56) References Cited

U.S. PATENT DOCUMENTS

| | | | | |
|---|---|---|---|---|
| 8,897,505 | B2* | 11/2014 | Gokturk | G06F 17/30253 |
| | | | | 382/118 |
| 9,620,168 | B1* | 4/2017 | Townsend | G11B 27/02 |
| 9,659,380 | B1* | 5/2017 | Castellani | G06K 9/00718 |
| 9,779,287 | B2* | 10/2017 | Steinberg | G06K 9/00295 |
| 9,881,234 | B2* | 1/2018 | Huang | G06K 9/6232 |
| 2014/0023341 | A1 | 1/2014 | Wang et al. | |
| 2014/0105459 | A1 | 4/2014 | Bobbitt et al. | |
| 2015/0169938 | A1* | 6/2015 | Yao | G06K 9/00261 |
| | | | | 382/103 |
| 2016/0063727 | A1* | 3/2016 | Gao | G06K 9/00335 |
| | | | | 382/103 |
| 2016/0171283 | A1* | 6/2016 | Masood | H04N 7/181 |
| | | | | 382/103 |
| 2016/0171311 | A1* | 6/2016 | Case | G06K 9/00771 |
| | | | | 382/103 |
| 2016/0180197 | A1* | 6/2016 | Kim | G01S 5/16 |
| | | | | 382/103 |
| 2017/0083796 | A1* | 3/2017 | Kim | G06K 9/6267 |
| 2017/0330059 | A1* | 11/2017 | Novotny | G06K 9/66 |

OTHER PUBLICATIONS

Alavi, A., Yang, Y., Harandi, M. and Sanderson, C., Sep. 2013, Multi-shot person re-identification via relational stein divergence. In Image Processing (ICIP), 2013 20th IEEE International Conference on (pp. 3542-3546). IEEE.

Liu, X., Song, M., Tao, D., Zhou, X., Chen, C. and Bu, J., 2014. Semi-supervised coupled dictionary learning for perso re-identification. In Proceedings of the IEEE Conference on Computer Vision and Pattern Recognition (pp. 3550-3557).

Satta, R., Fumera, G. and Roli, F., Sep. 2011, Exploiting Dissimilarity Representations for Person Re-dentification. In SIMBAD (pp. 275-289).

Satta, R., Fumera, G., Roli, F., Cristani, M. and Murino, V., 2011. A multiple component matching framework for person re-identification. Image Analysis and Processing—ICIAP 2011, pp. 140-149.

* cited by examiner

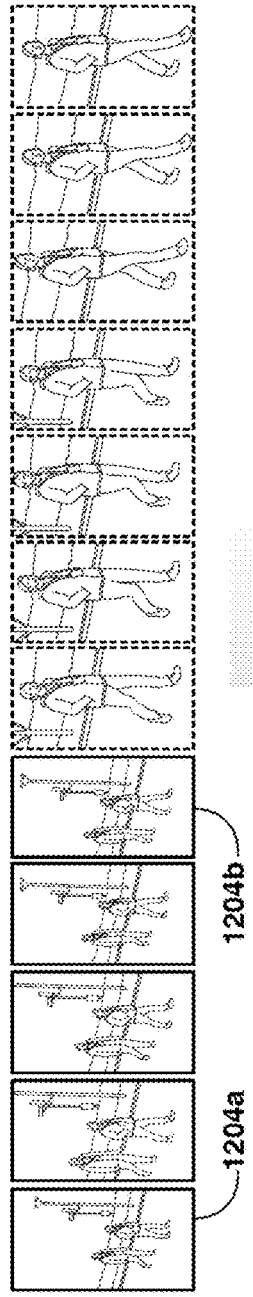
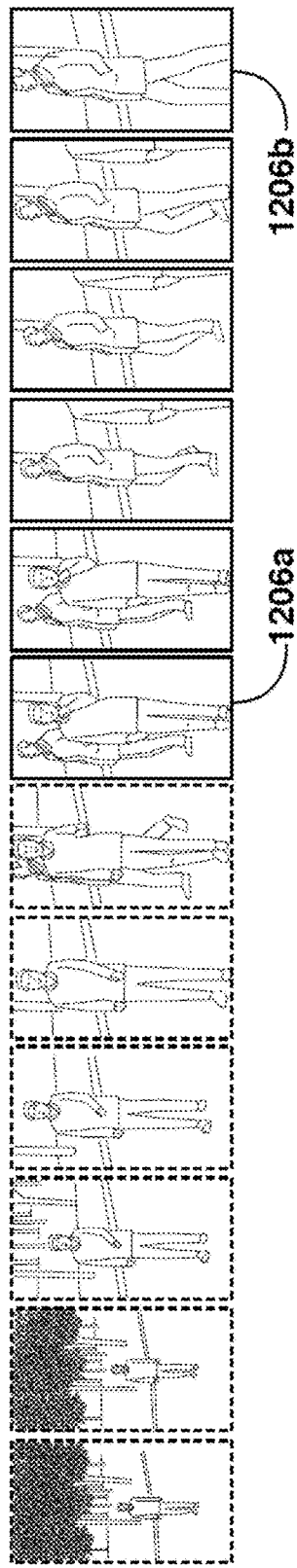
FIG. 12A
FIG. 12B
FIG. 12C

METHOD AND APPARATUS FOR ANNOTATING A VIDEO STREAM COMPRISING A SEQUENCE OF FRAMES

FIELD

This relates generally to the field of video processing, and in particular to video-based object tracking.

BACKGROUND

Video surveillance systems can be used to track objects appearing in videos. Surveillance video can also be used to search for objects, including people, appearing in a video. Modern video equipment can produce enormous quantities of data, which is time-consuming, costly and inefficient to manually review. Machine learning and computer vision technology can be used to aid in surveillance. However, surveillance tasks such as person re-identification typically require training of models based on supervised machine learning, which relies on manual frame-by-frame review of video frame data by a human operator to annotate individual images. Use of such systems can therefore be expensive.

SUMMARY

An example method of annotating a video stream comprising a sequence of frames comprises: scanning a first frame in the sequence of frames for a person; adding, to a video track, a representation of a region of interest of the first frame likely to contain an image of the person; scanning a next frame in the sequence of frames for a person, beginning at a spatial location in the next frame based on a location of the region of interest of a preceding frame; adding, to a video track, a representation of a region of interest of the next frame; and assigning a label to the video track based on whether at least one of the regions of interest in the video track contains an image of a particular person.

In some embodiments, the representation of the region of interest of the first frame comprises a set of coordinates indicating a position and dimensions of the region of interest.

In some embodiments, the representation of the region of interest of the first frame comprises image data extracted from the region of interest of the first frame.

In some embodiments, the method further comprises prior to the assigning, displaying the video track on a display device.

In some embodiments, assigning a label to the video track comprises assigning a positive label to the video track if at least one of the regions of interest in the video track contains the particular person.

In some embodiments, a number of frames containing the particular person in the positively labelled video track is less than a total number of frames in the positively labelled video track.

In some embodiments, the video stream contains images of more than one person, and wherein the video track comprises a plurality of video tracks, wherein each of the plurality of video tracks corresponds to each of the respective more than one persons.

In some embodiments, the first frame and the next frame are consecutive frames from the video stream.

In some embodiments, the scanning the first frame comprises analyzing pixel data.

In some embodiments, the analyzing comprises computing metadata based on said pixel data.

In some embodiments, the scanning the first frame comprises: analyzing a portion of the first frame contained within a sliding window; and determining a probability that the portion contains the person.

In some embodiments, the method further comprises constructing a similarity model for the particular person based on the labelled video track.

In some embodiments, said constructing comprises constructing using a multiple-instance learning algorithm.

An example system for annotating a video stream comprising a sequence of frames comprises: a processor; a memory containing computer-readable instructions for execution by said processor, said instructions comprising: a video analytics module for producing a video track, the video analytics module comprising: a human body detection module for scanning image data in the sequence of frames for a person; a visual feature extraction module for adding, to the video track, representations of regions of interest of the sequence of frames likely to contain the person; a human body tracking module for determining a starting location for said scanning in frames of said sequence of frames based on a location of a region of interest in a preceding frame; a labelling module for assigning a label to the video track based on whether at least one of the regions of interest in the video track contains an image of a particular person; and a storage for storing the labelled video track.

In some embodiments, the representations of the regions of interest comprise a set of coordinates indicating a position and dimensions of the region of interest.

In some embodiments, the representation of the region of interest comprises an image of the region of interest extracted from a frame.

In some embodiments, the system further comprises a display device for displaying the video track prior to labelling the video track.

In some embodiments, assigning the label to the video track comprises assigning a positive label to the video track if at least one of the regions of interest in the video track contains the particular person.

In some embodiments, a number of frames containing the particular person in the positively labelled video track is less than a total number of frames in the positively labelled video track.

In some embodiments, the scanning comprises scanning consecutive frames of the video stream.

In some embodiments, the scanning comprises analyzing pixel data.

In some embodiments, the analyzing comprises computing metadata based on the pixel data.

In some embodiments, the scanning the first frame comprises: analyzing the image data contained within a sliding window; and determining a probability that the sliding window contains the person.

In some embodiments, the system further comprises a visual similarity module for constructing a similarity model for he particular person based on the labelled video track.

In some embodiments, said constructing comprises constructing using a multiple-instance learning algorithm.

An example computer-readable storage medium has stored thereon computer-executable instructions that, when executed by one or more processors, cause the one or more processors to perform a method of annotating a video stream comprising a sequence of frames, the method comprising: scanning a first frame in the sequence of frames for a person; adding, to a video track, a representation of a region of interest of the first frame likely to contain an image of the person; scanning a next frame in the sequence of frames for a person, wherein the scanning of the next frame begins at a spatial location in the next frame based on a location of the region of interest of a preceding frame; adding, to the video track, a representation of a region of interest of the next frame; assigning a label to the video track based on whether at least one of the regions of interest in the video track contains an image of a particular person.

Computing systems described herein may include the above-noted features in any combination.

BRIEF DESCRIPTION OF DRAWINGS

In the figures, which illustrate example embodiments:

FIG. 12A is a first example video track containing ROIs;

FIG. 12B is a second example video track containing ROIs;

FIG. 12C is a third example video track containing ROIs; and

DETAILED DESCRIPTION

Embodiments described herein provide systems, processes and devices for annotating videos for video-based object searching (VBOS). Intelligent video analytic technologies based on computer vision and machine learning can be used to implement aspects of embodiments described herein. For intelligent video analytic technologies, VBOS processes extract and label information from video frames containing objects of interest. The extracted information is used for ultimate decision-making with respect to matching objects of interest in a given video with an object of interest previously identified in other videos. Many examples described herein relate to video-based people searching (VBPS), although aspects herein are applicable to objects other than people (e.g. vehicles).

VBPS processes can be challenging when searching for people within videos recorded by multiple cameras deployed over a wide geographical area. Videos recorded by different cameras at different times tend to have high degrees of photometric and geometric variation in the appearance of the same person. For example, a person in motion will appear at different angles, and at different distances from different cameras. In addition, a person may wear different clothes and accessories at different times.

Owing in part to the aforementioned high degree of variation, some aspects of machine learning (for example, multiple instance learning) require a large amount of training data in order for a machine-learned model to identify a person accurately. Multiple instance learning also requires the training data to be annotated to include a label indicative of a property of the data (e.g. that an image or video contains images of a particular person or object).

Figure 1:
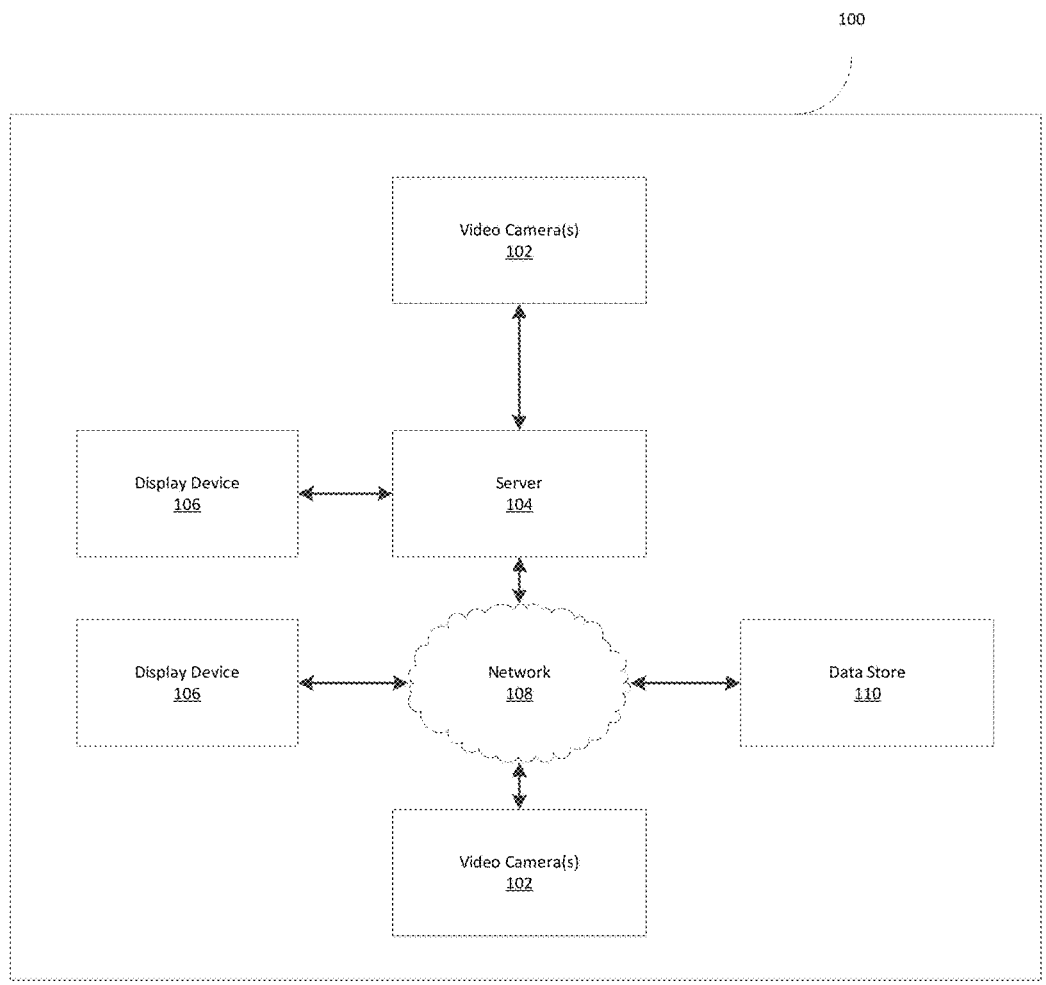
FIG. 1 is a block diagram of an example video track annotation system.
Figure 3:
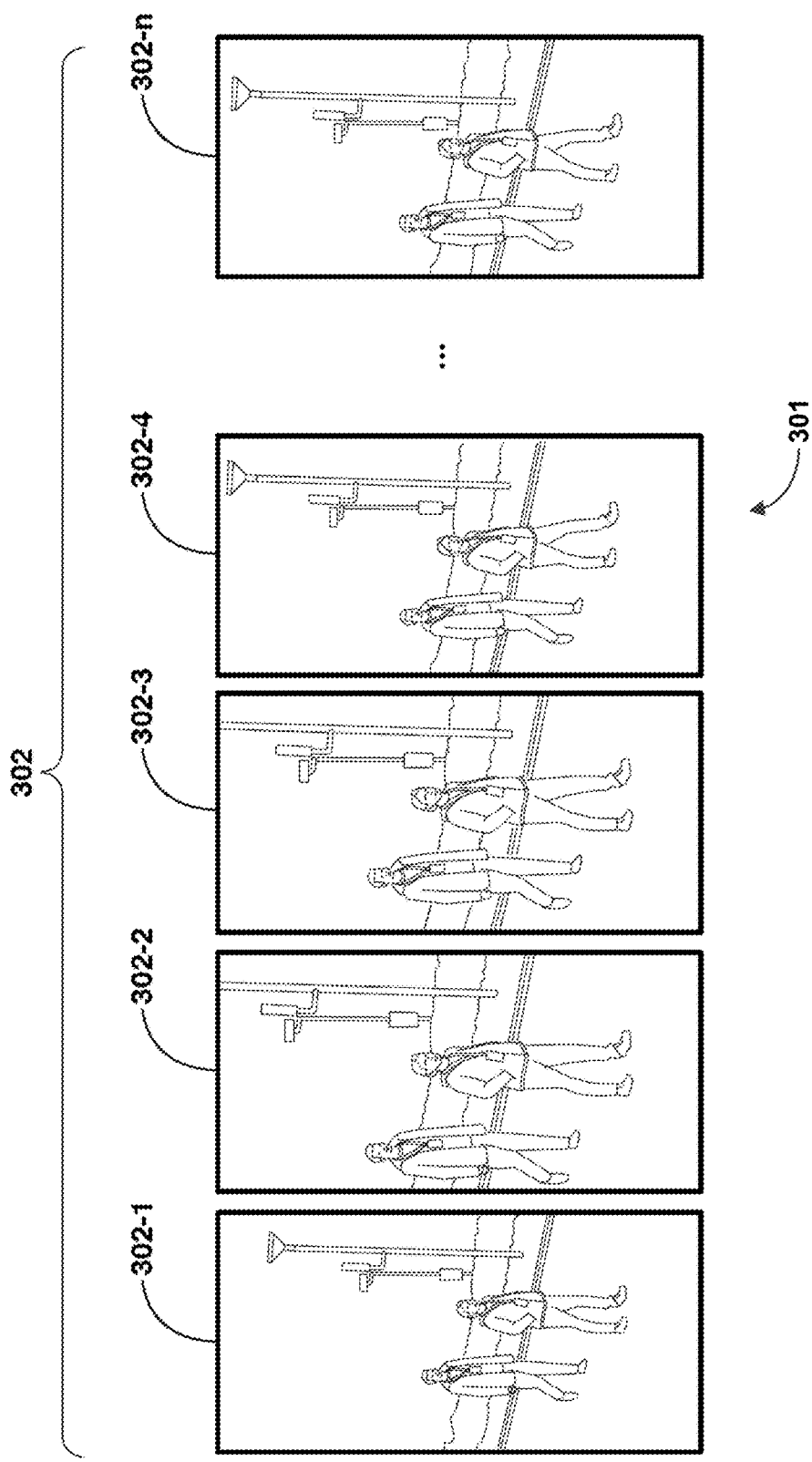
FIG. 3 is an illustration of frames of an example video stream.

FIG. 1 is a block diagram of an example video processing system 100. In some embodiments, the video processing system 100 is a video surveillance system. The video processing system 100 includes a server 104 and one or more video cameras 102, display devices 106 and data stores 110. For simplicity, only one server 104 is shown in FIG. 3. However, video processing system 100 can have multiple servers 104.

Server 104 connects to other components in various ways such as through network 108. Network 108 has wired connections, wireless connections, or a combination thereof for sending and receiving data. Network 108 can implement various network communication technologies, standards and protocols, such as Global System for Mobile Communications (GSM), Code Division Multiple Access (CDMA), wireless local loop, WMAX, Bluetooth, Long Term Evolution (LTE), or the like. Network 108 can include different physical media such as one or more of coaxial cable, fiber optics and base transceiver stations. Example network types include the Internet, ethernet, plain old telephone service (POTS) lines, public switched telephone network (PSTN), integrated services digital network (ISDN), digital subscriber line (DSL), and others, including combinations thereof. Network 108 can be a local area network (LAN) or a wide area network (WAN) or combinations thereof.

Figure 2:
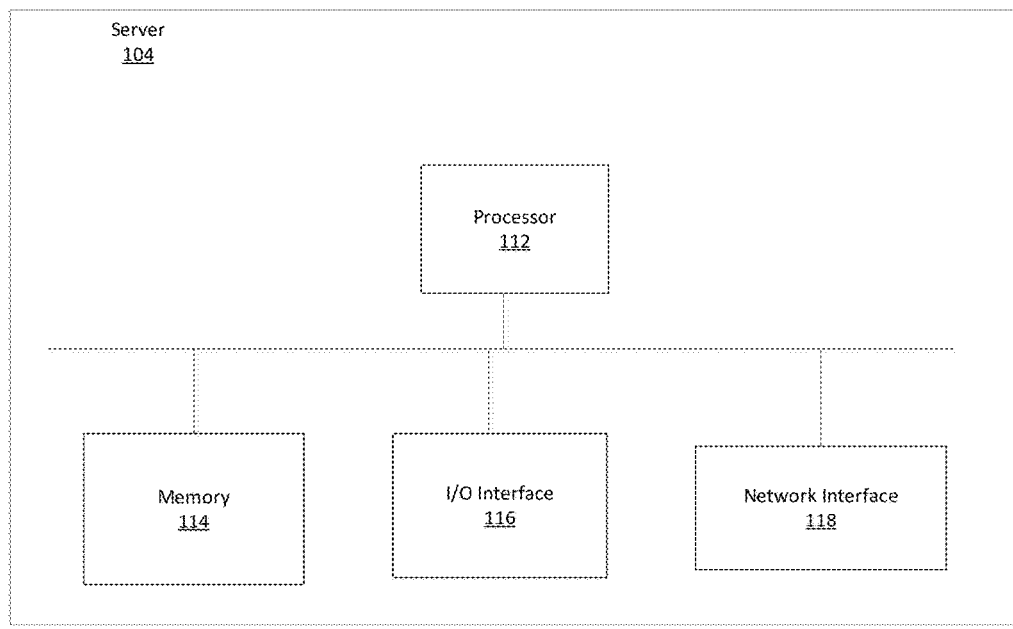
FIG. 2 is a block diagram illustrating hardware components of example server.

FIG. 2 is block diagram illustrating components of example server 104. As depicted, server 104 comprises at least one processor 112, memory 114, at least one I/O interface 116, and at least one network interface 118. The processor 112 can execute instructions on memory 114 to implement various aspects of video based people searching described herein.

Each processor 112 may be an Intel or AMD x86 or x64, PowerPC or ARM processor. Processor 112 may operate under control of software loaded in memory 114. Network interface 118 connects server 104 to network 108. I/O interface 116 connects server 104 to data store 110 and may further connect server 104 to one or more peripherals such as keyboards, mice, USB devices, disc drives, and the like.

Memory 114 includes a combination of any type of computer memory that is located either internally or externally, such as random access memory (RAM), read-only memory (ROM), compact disc read-only memory (CD-ROM), electro-optical memory, magneto-optical memory, erasable programmable read-only memory (EPROM), electrically-erasable programmable read-only memory (EEPROM), ferroelectric RAM (FRAM), or the like.

I/O interface 116 enables server 104 to interconnect with one or more input devices, such as a keyboard, mouse, camera, sensors, touchscreen and a microphone, or with one or more output devices such as a display screen and a speaker. In some embodiments, the I/O interface transmits control commands to control video cameras 102 and the capture of video data feeds, for example. The I/O interface 116 transmits commands to processor 112 to enable labelling of video tracks. The I/O interface 116 transmits control commands to processor 202 to enable the manual identification and labelling of ROIs in video frames by a user.

Network interface 118 enables server 104 to communicate with other components, to exchange data with other components, to access and connect to network resources, server applications, and perform other computing functionality by connecting to a network (or multiple networks) capable of carrying data.

Server 104 can register and authenticate users (using a login, unique identifier, and password, for example) prior to providing access to video data feeds, processed video data, a local network, network resources, other networks and network security devices. Server 104 can serve one user, customer or customer site, or multiple users, customers or customer sites.

Software is loaded onto server 104, for example from peripheral devices or from network 108.

In some embodiments, the server 104 receives video data streams from one or more video cameras 102. The video cameras 102 can be the same type of camera device or can be different types of camera devices. The video cameras 102 are coupled to a hub, router or other device to collect and aggregate video data feeds for provision to server 104. The video cameras 102 can be located to record data at one or more locations. For example, video cameras 102 may be located at different buildings, different parts of the same building, or the like. The video cameras 102 capture real-time or near real-time video of the regions being recorded. The video cameras 102 generate video data streams of sufficient quality to identify objects of interest within at least some of the recorded video frames.

As depicted, data store 110 receives and stores video data streams from video cameras 102. Data store 110 comprises, for example, one or more servers, a data center, storage devices, or the like. Data store 110 provides a central data repository for server 104 and other users, which can include customers or customer sites.

Server 104 and data store 110 may be located remotely from users and from video cameras 102, and may provide remote (e.g. "cloud") storage and processing resources. Additionally or alternatively, one or more cameras 102 can be local to the server 104.

The server 104 receives video data streams, each of which includes a sequence of video frames. The video streams are received by server 104 from at least one of video cameras 102 and data store 110. For example, video streams may be recorded by a video camera 102, sent to server 104 and processed upon receipt. Alternatively or additionally, feeds may be recorded, stored at data store 110 and thereafter sent to server 104 for processing. At least some of the video frames contain one or more people or objects of interest. For the purposes of illustration, the examples described herein contain people. However, the objects of interest can be objects other than people, for example vehicles. The server 104 stores the video feeds in the data centre 110.

In some embodiments, the server 104 is operable to process the video streams to identify frames containing a person of interest. In an example, such processing includes scanning frames of a video stream for a person of interest. Such processing further includes delineating a region of interest (ROI) around a person of interest in each frame likely to contain a person of interest. Such processing further includes assigning a label to a sequence of identified ROIs (a video track) indicating whether at least one of the ROIs contains an image of a particular person.

FIG. 3 is an illustration of an example video stream 301 comprising a sequence of frames 302-1, 302-2, 302-3, 302-4, . . . , 302-n, collectively frames 302.

Figure 4:
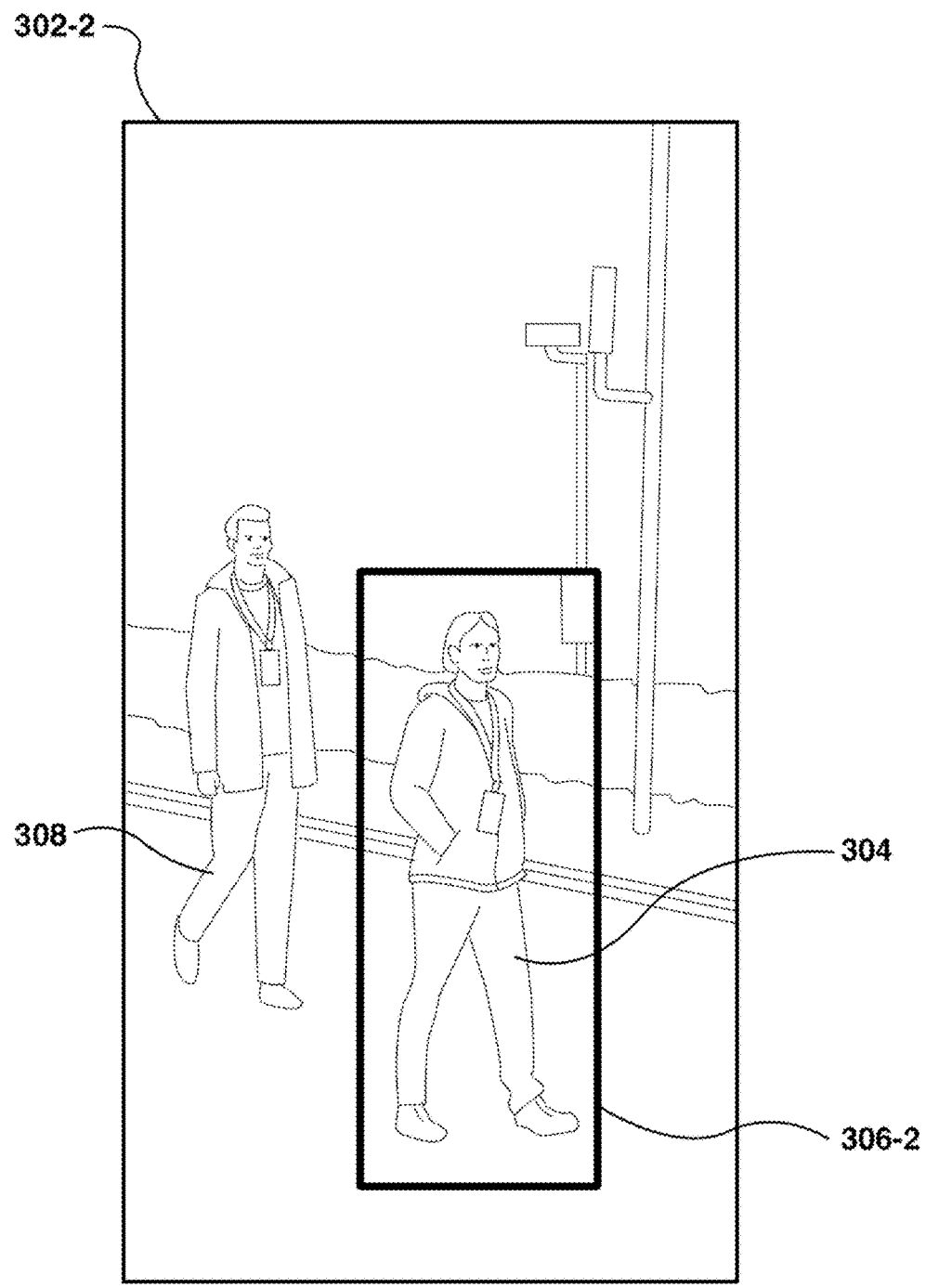
FIG. 4 is an enlarged illustration of a frame from FIG. 3.

FIG. 4 is an enlarged illustration of frame 302-2 from video stream 301. Frame 302-2 contains a first person 304 and a second person 308. A region of interest (ROI) 306-2 within frame 302-2 contains an object of interest. In the example of FIG. 4, the object of interest is first person 304 and the illustrated ROI 306-2 contains an image of first person 304. In FIG. 4, the ROI 306-2 is depicted as being rectangular, however other shapes for the ROI are possible.

Figure 5:
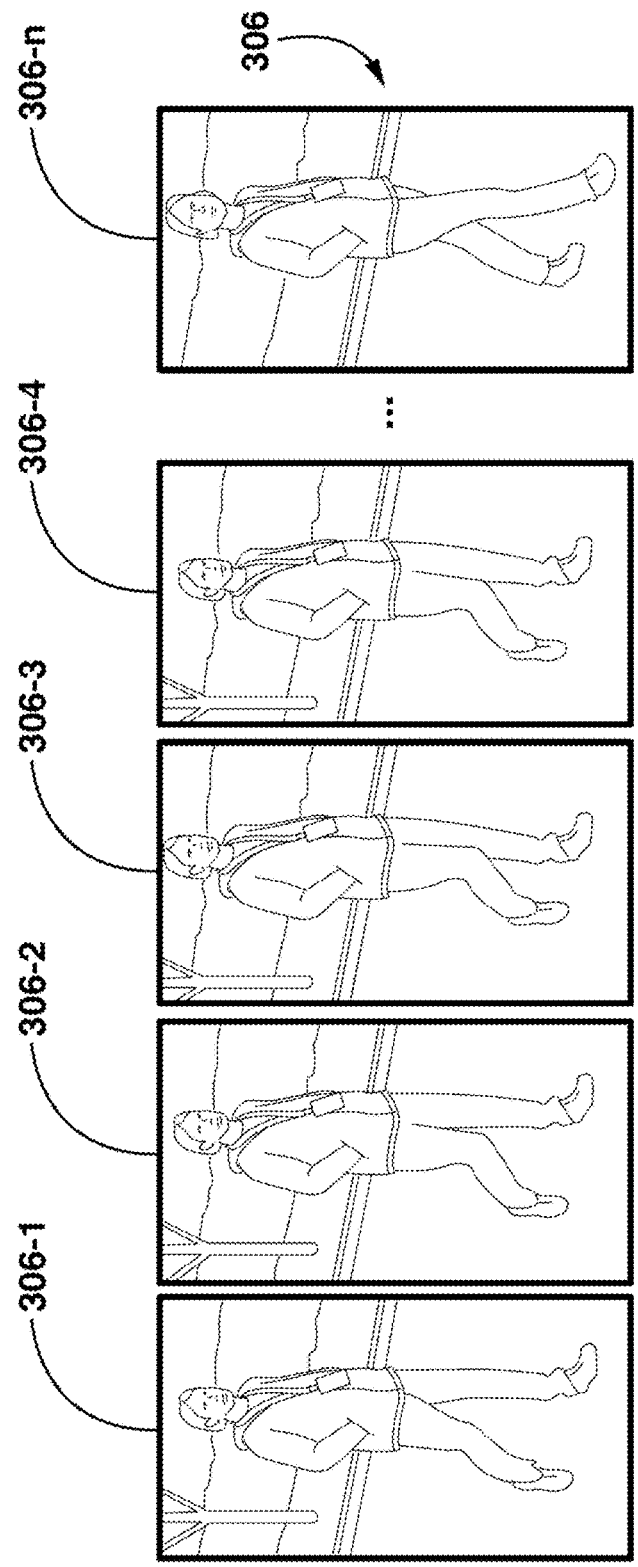
FIG. 5 is an illustration of a series of ROIs from a video stream.

FIG. 5 is an illustration of a series of ROIs 306-1, 306-2, 306-3, 306-4 . . . 306-n in video stream 301. A series of ROIs is referred to herein as a video track 306. As can be seen in FIG. 5, each of ROIs 306-1 to 306-n in video track 306 contains an image of first person 304. Video track 306 can be assigned a label denoting that video track 306 contains images of first person 304. The process of identifying regions of interest in a sequence of video frames 302 and assigning a label to a video track 306 is referred to herein as annotation.

Video track 306 is stored in data store 110. In some embodiments, video track 306 is stored as a set of images from each frame determined to include a person of interest. In some embodiments, video track 306 is stored as a collection of data objects, data structures, values and combinations thereof which identify a frame index, and coordinates, such as for a corner of the ROI 306-2 in the frame corresponding to the frame index, and height and width measurements of the ROI 306-2.

Identification of ROIs can be carried out manually. For example, a user can identify ROIs within individual frames of a video data stream on a frame-by-frame basis. However, manually identifying ROIs can be time-consuming. Accordingly, video frames may be processed and annotated by a computing device, such as server 104.

Figure 6:
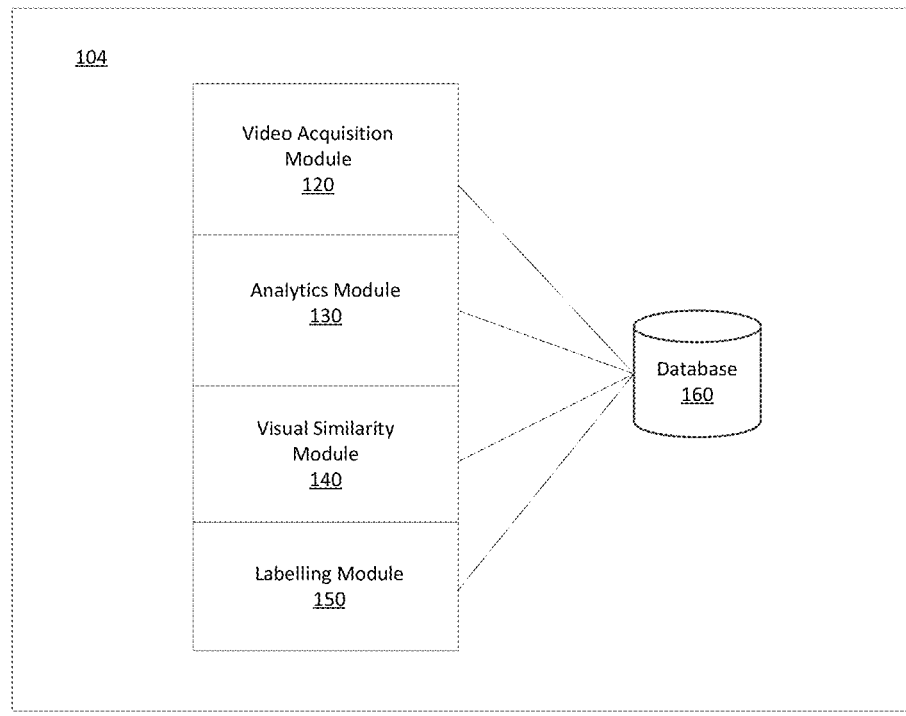
FIG. 6 depicts a simplified arrangement of software modules running at a server.

FIG. 6 depicts a simplified arrangement of software modules running at server 104. As depicted, the software includes a video acquisition module 120, an analytics module 130, a visual similarity module 140, a labelling module 150, and database 160. As described in further detail hereinafter, video acquisition module 120 receives video streams, for example from cameras 102, data store 110, or database 160. Analytics module 130 analyzes video streams to generate video tracks by video indexing techniques, which can include but are not limited to background subtraction, human body detection and human body tracking. Labelling module 150 is configured to label video streams or portions thereof as containing images of a particular person, from which models can be constructed for identifying images of that particular person. Visual similarity module 140 is configured to receive video streams and, by comparison to existing models, label video feeds as likely containing a specific person. Both of labelling module 150 and visual similarity module 140 use analytics module 130 for performing their respective analyses.

Database 160 comprises one or more data structures containing video data streams 301 and video tracks 306. In an example, database 160 contains two separate databases storing video data streams and video tracks, respectively.

Figure 7:
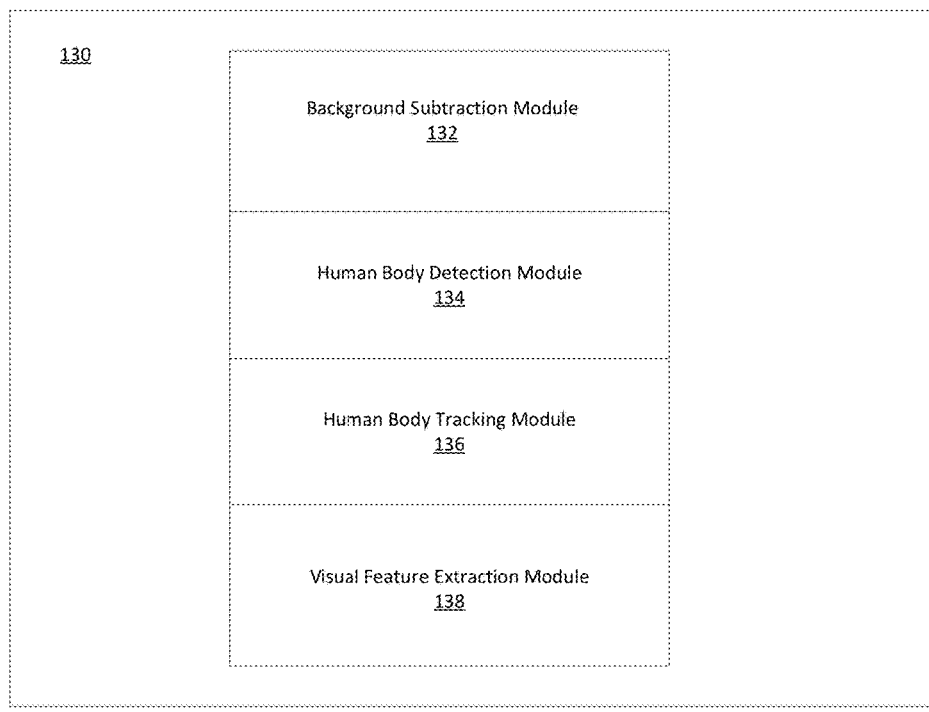
FIG. 7 depicts components of the analytics module of FIG. 6 in greater detail.

FIG. 7 depicts components of analytics module 130 in greater detail. As depicted, video analytics are performed by background subtraction module 132, human body detection module 134, human body tracking module 136, and visual feature extraction module 138. In other embodiments, additional modules may be present, e.g. for performing additional analytical functions.

In some embodiments, the locating and defining of ROIs can be performed automatically using background subtraction module 132, human body detection module 134, and human body tracking module 136.

Background subtraction module 132 accepts video data streams, for example from video cameras 102, data store 110 or database 160 and performs background subtraction. Background subtraction techniques can highlight the foreground of a video frame while de-emphasizing the background. For example, background subtraction can be performed by comparing a current frame to a reference frame and taking the difference. In situations where the camera recording the video is static, taking the difference between the current frame and the reference frame will de-emphasize static background features which have not changed appreciably, and emphasize features which are dynamic.

In an example, a reference frame is a frame representing a time-average of consecutive frames within a time window of a predefined length (T). In some scenarios, the frames depict a scene with a background and a foreground. The background can have frequent variation in appearance resulting from frequent movement (e.g. moving tree leaves), noise, or the like. The foreground can contain a moving object. A complex scene may be processed by independently modelling each pixel in a video frame using a Gaussian Mixture Model (GMM) trained via a recursive expectation-maximization (EM) procedure. A GMM with a finite number of mixture components can be defined as a linear combination of the mixture components, each of the mixture components being a Gaussian distribution. In addition, the sum of the coefficients for the linear combination is equal to one. Given a pixel location and the pixel's GMM, the coefficients represent the proportion of various colours within the predefined time window T at that pixel location. Given a new video frame, in addition to updating the model parameters, a subset of the mixture components with the largest mixing coefficients are selected to constitute the background model. The pixels of the frame are classified as either foreground or background based on the background model and can be subtracted to isolate foreground objects. Background subtraction facilitates computer vision and detection of moving objects in video frames.

Figure 8A:
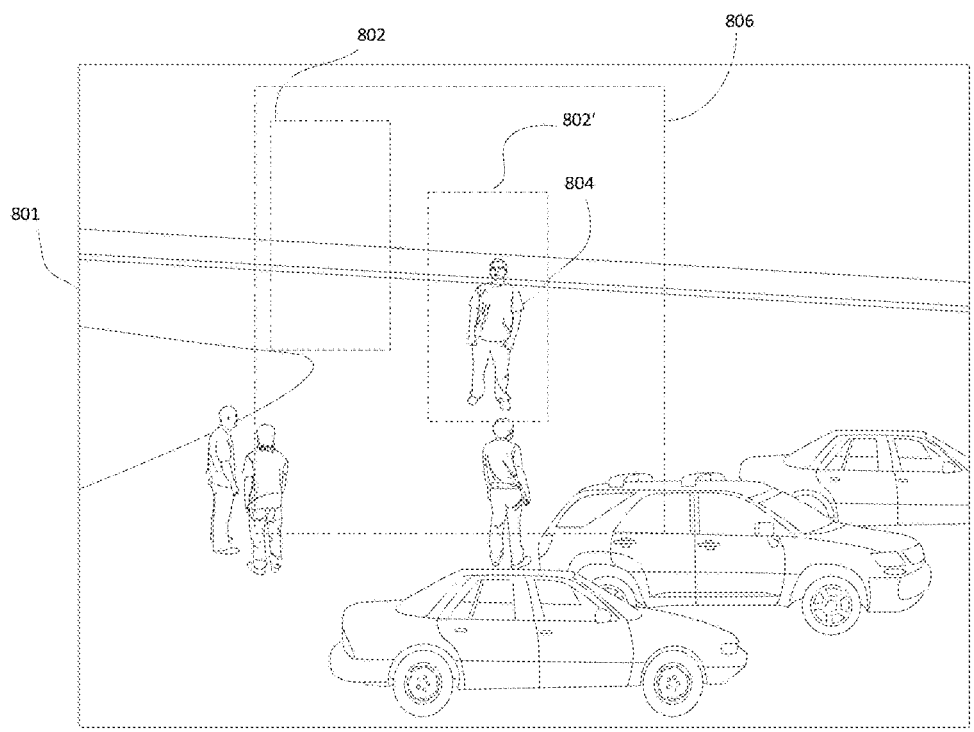
FIGS. 8A and 8B show an example of a sliding window in a video frame before and after re-sizing.

Human body detection module 134 is operable to scan a video frame to search for images of a person. Detection can be performed using a sliding window object detection technique. FIG. 8A shows an example of a sliding window 802 in a video frame 801. The sliding window 802 begins in a default starting location within a video frame, e.g. the upper left corner. The sliding window 802 has dimensions smaller than the video frame and is moved to raster scan the entire frame. For example, a sliding window might be 24×48 pixels in size. After analyzing the contents of the sliding window for a given position, the sliding window is displaced to another starting position, as shown by directional arrow A and sliding window 802' in FIG. 8A.

The number of pixels by which the sliding window 802 is displaced along the vertical and horizontal directions (the spatial stride) can be predefined depending on the competing requirements of computational complexity and the spatial granularity of the detection.

Figure 8B:
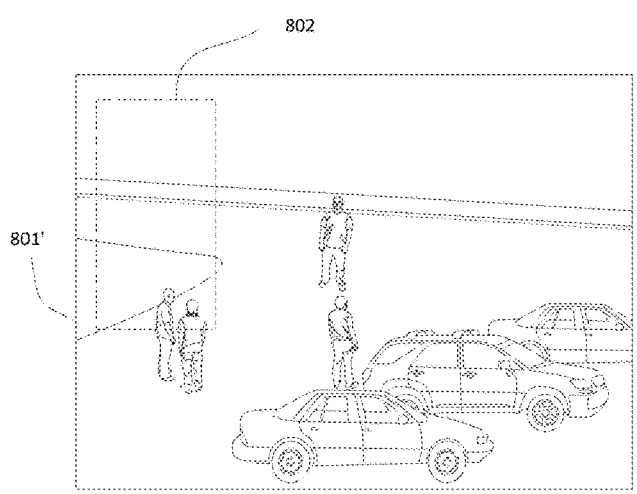

In some embodiments, the sliding window detection is repeated with the video frame 801 downscaled to different sizes, each time by a scaling factor. When the sliding window 802 is applied to the downscaled images of the video frame, it is equivalent to applying a larger sliding window 802 to the original frame. The purpose of scaling a video frame 801 down to a smaller frame 801' is to detect the instances of an object appearing in different sizes. FIG. 8B shows an example of a sliding window 802 applied to a scaled down frame 801'.

The raw pixels within sliding window 802 are collectively represented using a d-dimensional feature vector denoted herein as $\vec{x}$ and $\vec{x} \in R^d$. The process of computing $\vec{x}$ is referred to as feature extraction. Given a set of training images, which are the same size as the sliding window 802 and include either a centered human body or a different object (e.g. an object appearing in the background of a specific application scenario), a model can be learned using the feature vectors from the set of training images. After the model has been learned, the model can be used to predict the existence of a human body within a new sliding window image which has not yet been used for training.

The output of the model can include one or more of a probability and a confidence score of the presence of an instance of the human body. The output can then be compared to a predefined threshold to make a decision as to the presence or absence of the human body in the sliding window 802.

During detection, and upon the completion of video frame scanning, there may be redundant ROIs surrounding each instance of the human body. An ROI indicates that an instance of the object has been detected in the sliding window 802. To remove the redundancy and improve the localization accuracy, non-maximum suppression (NMS) can be applied. The output of an NMS process can be the output from the human body detection module 134.

It should be noted that the concepts described herein can also be applied to the detection of objects other than people. Depending on the type of object, the concepts described herein should be expected to be used to find the location and extent of some or all of the instances of the object under consideration.

FIG. 8A shows an example of a sliding window 802 in a video frame 801. The image within sliding window 802 can be analyzed according to a number of known techniques for decision-making. For example, techniques for feature extraction include a histogram of oriented gradient (HoG), the use of Haar-like features, and integral channel features.

Possible classification models include Adaboost and linear support vector machines (SVMs). In addition, deep convolutional neural networks (CNN) have been applied to handle feature extraction and classification jointly, as CNNs can learn the model directly from raw pixels within sliding window images. An example illustrating the computation of detection is a SVM which classifies examples based on the distance from a data point to a decision hyperplane. The distance from the data point to the decision hyperplane may be treated as the detection confidence score. The SVM can calculate the distance through the equation $y = w^t \varphi(x) + b$, where w and b are the model parameters, and x and $\varphi(x)$ are the feature vector and the transformation of the feature vector, respectively. The parameters of the model are adapted to fit the training data using the maximum margin learning principle.

A positive result can be returned, for example when the probability that the sliding window 802 contains a human body exceeds a threshold value (e.g. a confidence score), or when the ratio of the probability that sliding window 802 contains a human body to the probability that sliding window 802 does not contain a human body exceeds a threshold value. In the example shown in FIG. 8A, the sliding window 802 does not contain a person. In the example in FIG. 8A, the position of the sliding window is then translated by an increment in one or more of the horizontal and vertical directions. As depicted, after a number of increments, sliding window 802' contains person 804.

Once the video frame 801 has been scanned, one or more sliding windows 802 which have the highest probability of containing a human body are identified. For example, human body detection module 134 may also detect additional in frame 801. The sliding windows 802 containing human bodies can be identified by a representation. For example, the representation can include the coordinates of the top left corner of the sliding window, and the height and width of the sliding window in pixels. The sliding windows 802' with the highest probability scores are ROIs. The human body detection module 134 then returns the location and dimensions of the ROIs in the video frame, together with an index identifying the frame from which the ROIs were obtained.

A person skilled in the art will appreciate that many parameters of the human body detection process can be varied to achieve suitable levels of performance and efficiency. For example, the spatial increment by which the sliding window is moved and image scaling factors can be modified to enhance performance and efficiency. For example, increasing the amount by which the position of the sliding window 802 in the direction of arrow A is incremented would decrease the number of iterations required to span frame 801, thereby increasing the speed at which the sliding window detection is performed and also reducing the accuracy. Scaling down the size of frame 801 would in turn increase the size of the sliding window 802 relative to frame 801, and would also increase the speed at which human body detection is performed.

Once a human body in a video frame has been detected by human body detection module 134, a representation of the ROI is sent to human body tracking module 136. The representation may include, for example, the position and size of the ROI of the video frame and an index identifying the frame to which the ROI corresponds. The representation is sent to human body tracking module 136, together with the video data.

The human body tracking module 136 analyzes subsequent video frames and attempts to identify additional ROIs containing the same person identified (e.g. person 804) in the ROI from the previous frame or previous frames.

After human body tracking module 136 receives the data from human body detection module 134, human body tracking module 136 then loads the next frame in the video and repeats the sliding window process described above. In some embodiments, during tracking, the scanning using the sliding window 802 is only executed within an area resulting from expanding a detected ROI within the previous frame (as depicted, for example, by expanded ROI 806 in FIG. 8A). A rectangular region of a video frame within which sliding window scanning is performed for object tracking is referred to as an expanded ROI. To track detected objects, the sliding window-based scanning is carried out within all expanded ROIs. That is, the human body tracking module 136 may initialize processing of a frame by predicting a new position of a body in the preceding frame and testing a sliding window within the predicted area. This process of tracking is known as detection-based tracking.

In some embodiments, the human body tracking module 136 periodically instructs human body detection module 134 to perform a new sliding window detection scan on the entire video frame. Such a repeated and periodic detection technique may be useful in detecting a person that has entered the video data track after the previous detection, since that person will not be tracked until that person has been detected for a first time.

Once a certain number of frames in the video data have been analyzed and ROIs therein identified, a representation of the ROIs is sent to visual feature extraction module 138. The representation may include, for example, the location, size and frame index for the ROI. In some embodiments, the information pertaining to all ROIs from a video data stream is sent to visual feature extraction module 138.

Visual feature extraction module 138 accepts ROI representation data from human body tracking module 136. In response, visual feature extraction module 138 extracts ROI images from each frame and creates a video track including all of the identified ROIs. In some embodiments, the video track is stored in database 160. In some embodiments, the size of the images in the video track to be stored in database 160 is compressed (e.g. scaled, or compressed using a data compression algorithm) so as to use less storage space.

Labeling module 150 is configured to receive a video track and assign a label to the video track. For example, a video track containing images of a certain person can be assigned a label which designates the video track as containing images of that person. In some embodiments, the label is unique for each person. The video track can be labelled by the user prior to being stored in database 160. The video track can also be labelled by the user after being stored in database 160.

Server 104 further comprises visual similarity module 140. Visual similarity module 140 is operable to receive video tracks and determine whether the received video tracks contain a particular person. The visual similarity module 140 is operable to build visual similarity models for a particular person. Visual similarity models can be developed based on annotated video tracks using machine learning techniques which use as many images as possible for a particular person.

In some embodiments, the visual similarity model is trained using supervised learning techniques. Two examples of supervised learning are supervised classifier learning and supervised distance metric learning. Supervised classifier learning may be useful in applications where the goal is to assign a category to a candidate from among a set of problem-dependent categories. Supervised distance metric learning can be applied to rank a set of candidates based on respective similarity measurements with respect to a given query candidate. Applications of supervised classifier learning and supervised distance metric learning are not mutually exclusive and may be combined. For example, when candidates require ranking, the candidates can be sorted based on their similarity to the learned classification model (e.g. the a posteriori probability of various classes for a given candidate). In another example, query candidates can be classified by first identifying a number of training examples that are most similar to the query using a learned distance metric followed by voting among the labels of the closest neighbours. As such, both supervised classifier learning and supervised distance metric learning can be applied to searching for instances of a particular person within a video data stream or plurality of video data streams.

As a general framework for machine learning, supervised classifier learning adapts the parameters of a classification model through an optimization algorithm which utilizes annotations of the training data provided through direct observation. When supervised classifier learning is applied, the classifier will assign a label included in the directly observed training data to a previously unseen example.

Figure 9A:
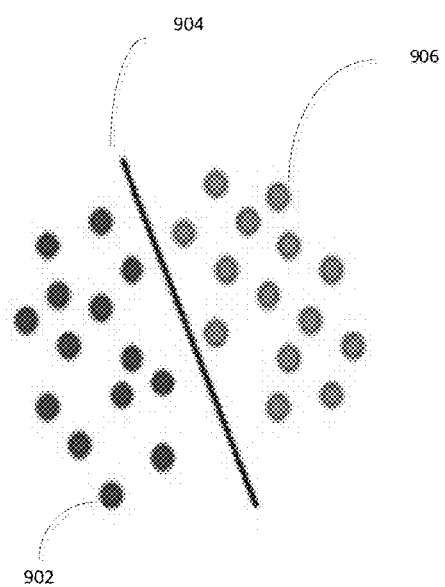
FIG. 9A shows an example representation of supervised classifier learning.

FIG. 9A shows an example representation of supervised classifier learning. Although the example in FIG. 9A is given in a 2-dimensional feature space, the underlying principles are generally applicable to a feature space of higher dimensionality. In FIG. 9A, the elements 902 and 906 belong to two different classes and are separated by a decision hyperplane 904. A supervised distance metric can be defined as $d_A(\vec{x}_i, \vec{x}_j) = (\vec{x}_i - \vec{x}_j)^T A(\vec{x}_i - \vec{x}_j)$, and the parameters A can be learned by minimizing the sum of pairwise distance between the examples in the same class while maximizing the separation between examples of different classes.

Figure 9B:
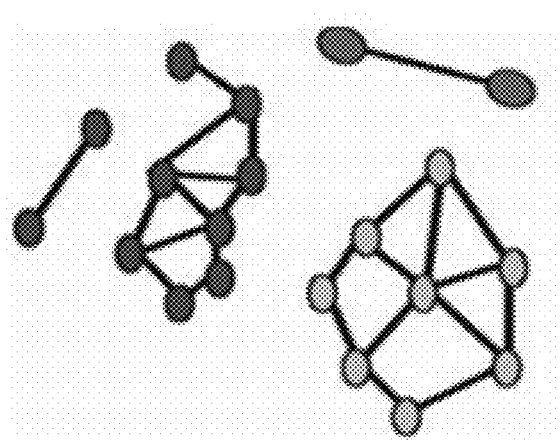
FIG. 9B shows an example representation of supervised distance metric learning.

FIG. 9B shows an example representation of supervised distance metric learning. In FIG. 9B, elements are evaluated on their relative distance from one another.

Supervised learning refers to machine learning techniques that utilize labelled training data. For example, in the embodiments described herein, the user is required to label a certain amount of video tracks belonging to each unique person based on manually reviewing the ROI images in each video track. In some embodiments, labelling a video track requires manual identification of the person in the video track. Manual review of video tracks by the user allows the visual similarity model to take human knowledge and judgment into account. This increases the likelihood that the visual similarity model will yield results that are consistent with a human's perception. As the number of video tracks labelled by a user increases, the visual similarity models used by visual similarity module 140 will become more accurate.

As noted above, in video data streams there is a high degree of photometric and geometric variation in the visual appearance of the same person when recorded by different cameras or at different times. For example, the same person may be wearing different clothes on a different day and thus have a different appearance. The colors may also be different in a video taken at night compared to a video taken during the afternoon. Likewise, a person in motion may assume many different angles, shapes and locations in a sequence of frames relative to the same video camera. Thus, it is desirable to have as many examples as possible of a person to be used in training a visual similarity model for that particular person.

Due to the above-noted issues, body detection module 134 and body tracking module 136 may return incorrect identifications (e.g. false positive or negative results). Certain images or image characteristics can interfere with detection-based tracking. For example, a human body may be obscured from view in the frame, such as by an object moving in front of a person, which would reduce the probability scores for the sliding window. In some embodiments, a new sliding window detection scan is requested by tracking module 136 when the probability scores for the tracking windows are below a predefined threshold probability score. The probability score being below a predefined threshold may indicate that the human body tracking module 134 has failed to follow a person, either because the tracking algorithm generates an error, or because the person is no longer in the frame. In this case, robust visual features or occlusion detection may help reduce tracking error.

As another example, an object other than the person identified in the preceding video frame (e.g. an object in the background) may be identified in a subsequent ROI. It is also possible that a human body belonging to a second person in a video frame may be mistakenly identified as the first person from a preceding frame by human body tracking module 136. In developing a visual similarity model with visual similarity module 140, video tracks are typically required to contain only images of the person of interest, because the presence of images of other people or objects (or noise, generally) can negatively impact the accuracy of visual similarity models.

Figure 10:
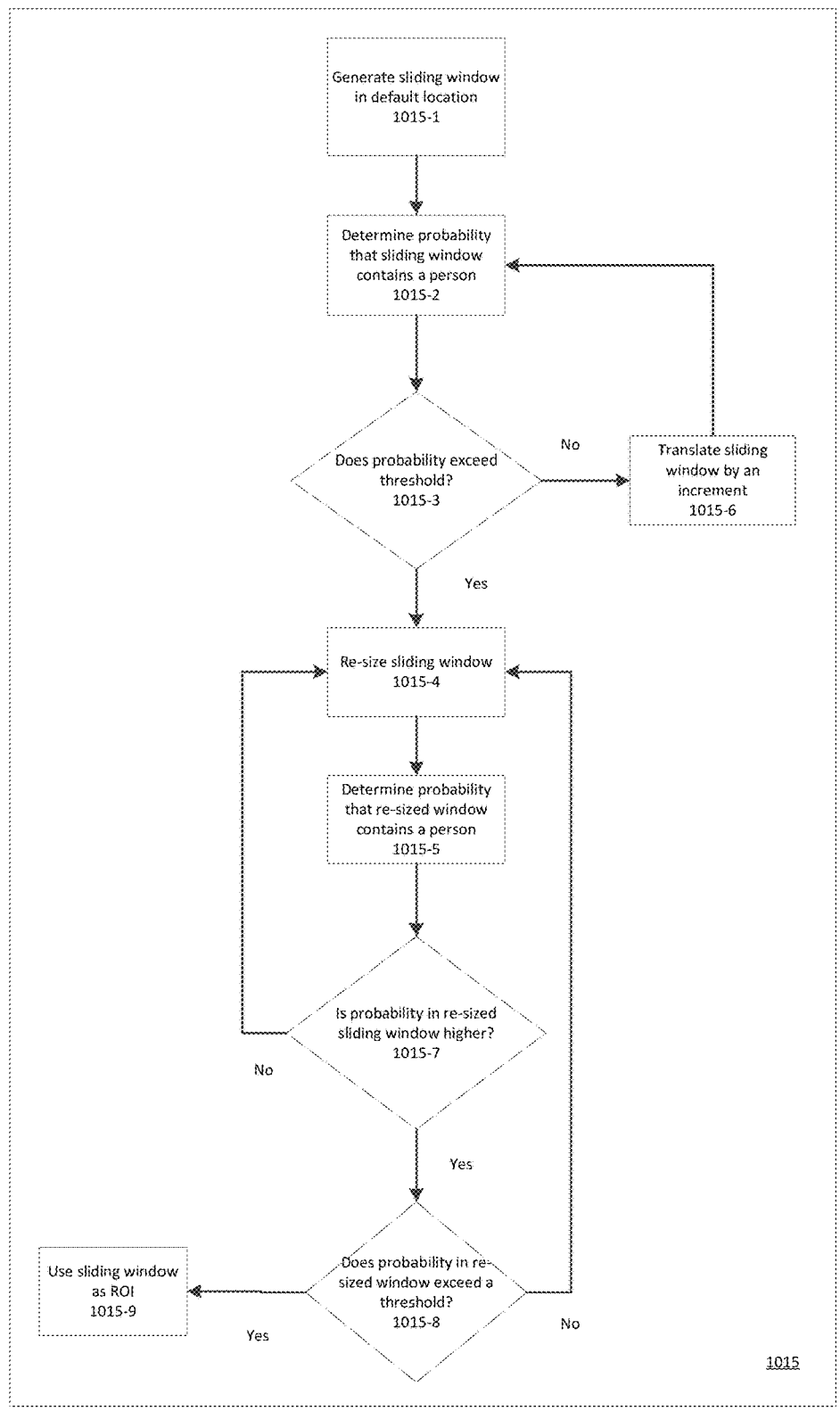
FIG. 10 is a flow diagram of an example process for scanning video frames for a person.

FIG. 10 is a flow diagram of an example process 1015 for scanning video frames for a person. At block 1015-1, a sliding window is generated in a default starting location within the video frame. At 1015-2, the human body detection module analyzes the video frame and determines the probability that the frame contains a person. At 1015-3, if the probability does not exceed a threshold, then the position of the sliding window is adjusted (e.g. translated) to a different position within the frame.

If the probability that the frame contains a person exceeds the threshold, then an iterative process begins at 1015-4 in which the sliding window is re-sized. Such re-sizing can include, for example, increasing or decreasing a height and/or width of the sliding window while keeping the coordinates of one of the corners of the sliding window constant. At 1015-5, the probability of the re-sized window containing a person is determined. At 1015-7, if the re-sized window has a higher probability than the sliding window from 1015-3, then the process proceeds to 1015-8, where the probability is compared to a second, higher threshold.

If the probability exceeds the second threshold, then at 1015-9 the re-sized sliding window is used as an ROI. The process 1015 can return a representation of the identified ROI. Representations of identified ROIs may include, for example, images of ROIs, or data representing the frame number, coordinates of a corner of the ROI, and dimensions of the ROI.

If at 1015-7, the probability of the re-sized window containing a person is not higher than the previous sliding window, then the process returns to 1015-4 and the previous sliding window is re-sized.

It should be noted that in some embodiments, the probabilities associated with various re-sized sliding windows can be stored in a data structure, and these stored probabilities can be used to identify the sliding window with the maximum probability for a given area of the frame. It should be further noted that other detection processes, such as those described above, are contemplated.

Figure 11:
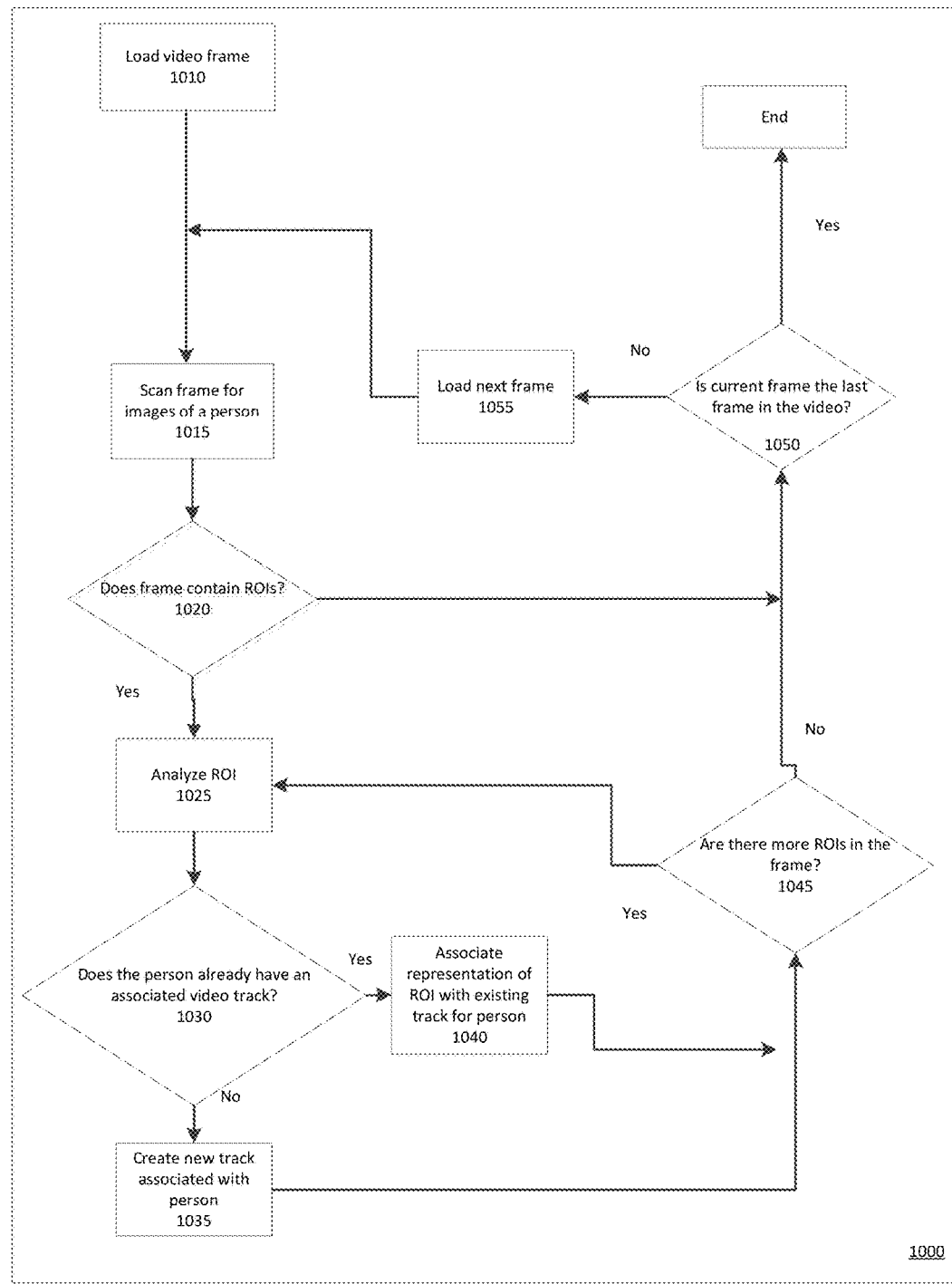
FIG. 11 is a flow diagram of an example process of performing visual indexing on a video containing people.

FIG. 11 is a flow diagram of an example process 1000 of performing visual indexing on a video containing people. At block 1010, a frame from the video data stream is loaded. At block 1015, the video frame is scanned for images of a person. For example, the scanning can be done using the sliding window technique described above in relation to FIG. 10 and return one or more ROIs.

At block 1020, if any ROIs are returned from block 1015, then the returned ROIs are analyzed at block 1025. If no ROIs are returned, then the process proceeds to block 1050.

At block 1030, if the person contained within the ROI returned at block 1025 already has an associated video track, then a representation of the ROI is associated with the existing video track for that person at block 1040. The representation of the ROI can include, for example, an image of the ROI, or data representing the frame number, coordinates of a corner of the ROI, and the dimensions of the ROI, or the like. If the person identified at step 1025 does not have an associated video track, then a new video track associated with that person is created at block 1035 and a representation of the ROI is stored in the new video track.

At block 1045, it is determined whether any more ROIs were identified during block 1015. If there are more ROIs in the frame, then the process returns to block 1025 and the next ROI is analyzed. If there are no more ROIs in the frame that have not been assigned to a video track, then the process proceeds to block 1050. At block 1050, it is determined whether the currently loaded frame is the last frame in the video. If the currently loaded frame is not the last frame, then the next frame from the video is loaded at block 1055. It should be appreciated that when the next frame is loaded at 1055, the subsequent scanning of the frame for ROIs at 1015 can base the initial position of subsequent sliding windows in the newly loaded frame on the position of the ROIs in the previous frame. This may improve the efficiency of the process of scanning subsequent frames for ROIs.

If the currently displayed frame is the last frame in the video, then the process 1000 ends and returns one or more video tracks. A person skilled in the art will appreciate that numerous other processes for video indexing are contemplated.

It should be noted that the output from visual indexing process 1000 may contain ambiguous ROIs which do not contain an image of the person of interest. As shown in FIG. 12A, for example, an ambiguous ROI might contain images of a feature in the background of a video frame rather than a person, as illustrated by the frames beginning with frame 1202*a* and ending with 1202*b*. Another example of an ambiguous ROI is an ROI which contains more than one person, as shown from frames 1204*a* to 1204*b* in FIG. 12B. A further example of an ambiguous ROI is a so-called "identity switch", in which the ROIs in the video track begin following a second person who is different from the person at the beginning of the video track, as shown from frames 1206*a* to 1206*b* in FIG. 12C.

Given the sensitivity of conventional supervised learning models to inaccurate training data, the removal of ambiguous ROIs has previously been important in the development of accurate visual similarity models. Typically, supervised learning models use single pictures as examples of a particular person, rather than groups of ROIs from a video. Therefore, the presence of an ambiguous ROI could have an effect on the training of a visual similarity model.

Some embodiments make use of a particular class of supervised learning known as multiple instance learning. In multiple instance learning, instead of receiving a set of individually labelled data elements (e.g. a set of ROIs individually labelled as containing a particular person), the learner receives "bags", each of which contains many instances (e.g. tracks containing many ROIs). Each track includes the person of interest and is labelled accordingly, but may also include one or more ROIs which do not contain any images of the person identified by the label.

Figure 13:
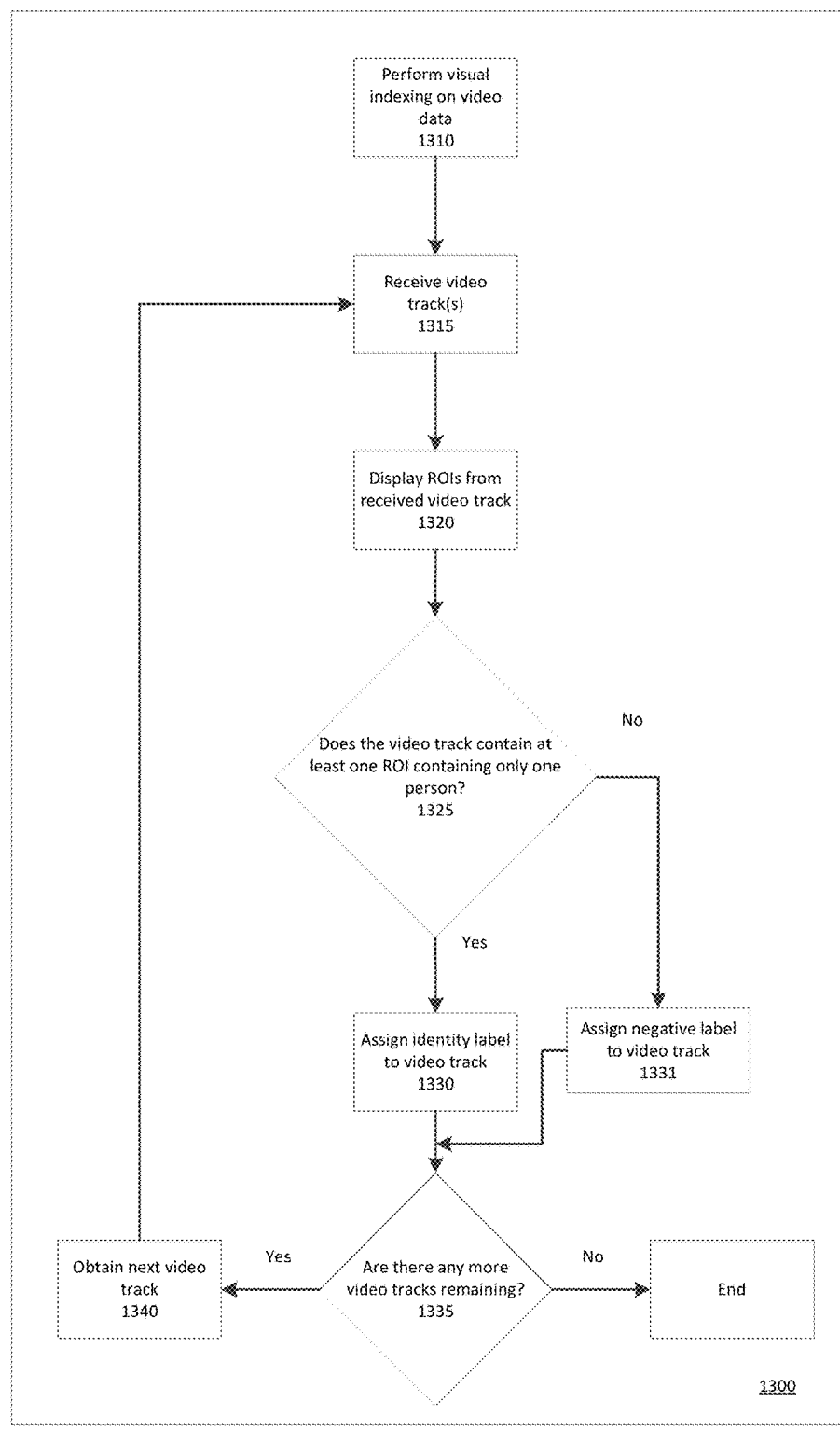
FIG. 13 is a flow diagram of an example process of annotating a video for use with a multiple instance learning-based approach.

FIG. 13 is a flow diagram of an example process 1300 of annotating a video for use with a multiple instance learning-based approach. At block 1310, visual indexing is performed on a video data stream. The visual indexing might result in more than one video track being created if more than one person is detected by the human detection module 134. Due to the challenges associated with performing video indexing in complex scenes (e.g. crowded scenes with variation in illumination), a person may be present in several video tracks that are disjointed in terms of time.

At block 1315, a video track containing a representation of identified ROIs from the video data stream is received. The representation of an ROI may include, for example, the ROI images, or data representative of the frame number, coordinates of a corner of the ROI, and dimensions of the ROI in the frame. At block 1320, the video tracks are displayed on a display device. The display device can display one or more of the ROIs of the video track at a time to the user.

At block 1325, the user determines whether at least one of the ROIs in the video track contains an image of one person without other people present. If the video track does not contain any ROIs containing only the person, the video track is labelled as negative for all persons of interest at block 1331 and the method proceeds to block 1335. In other words, this video track can be used as a negative example for training a classification model for any person of interest. If the video track has at least one ROI containing one person, then an identity label is assigned to the video track at block 1330. In some embodiments, multiple people may appear in a video track. In such a case, the label corresponding to the most frequently appearing person may be assigned to the video track. The identity label could be, for example, the name of the person who appears in the video track most frequently.

It should be appreciated that in process 1300, a video track is given a label corresponding to a person if the video track contains even a single ROI containing that person. Thus, process 1300 does not require the user to review the ROIs in a video track and remove ROIs which do not contain that person. It will be appreciated that a video track annotated according to process 1300 may contain one or more ROIs which do not contain images of that person. Thus, the number of frames containing the person in a positively labelled video track can be less than the total number of frames in the positively labelled video track. It is acceptable to use video tracks containing ambiguous ROIs which do not contain the person because over a large number of instances from a video, any ambiguous ROIs can expected to average out in training the visual similarity model.

Obviating the requirement to remove ambiguous ROIs from video tracks can result in a time saving compared to the manual annotation of ROIs in individual frames. For example, a single track containing ROIs from video frames captured at 24 or 30 frames per second may contain 100 or more ROIs containing a particular person. Rather than labelling each ROI, a user may simply confirm that the person is shown in the track and label the track as a whole.

After assigning an identity label to the video track at block 1330, the process then determines whether any other video tracks resulting from the visual indexing at block 1310 have not yet been reviewed. If there are more video tracks remaining, then the next video track is obtained at block 1340 and received at block 1315. If there are no more video tracks remaining, then process 1300 terminates.

It should be appreciated that process 1300 requires less time and effort from the user in order to annotate a video track as compared to processes in which ROIs must be annotated individually to identify and remove ambiguous ROIs. In other words, exploitation of multiple instance learning as described herein may obviate the need to annotate every ROI individually. Thus, a larger set of annotated video tracks can be created for a person with less time and effort from the user.

The annotated video tracks can be used to train visual similarity models for a specific person or persons, which can then allow for the searching of a video data stream for a specific person. In one example, to search for a person, the visual similarity module 140 predicts the likelihood of an unannotated video track containing a particular person.

Computing the likelihood of a given video including a particular person is performed by the visual similarity module 140. The visual similarity module 140 trains one or more visual similarity models for each person. In some embodiments, the visual similarity models are binary classifiers learned separately for each person based on the annotated video tracks. In some embodiments, the visual similarity models can calculate the likelihood of a particular person being found in a video track. As described above, for a supervised classifier model or a supervised distance metric model to be learned, multiple instance learning (MIL) techniques are employed so as to allow more efficient video track annotation relative to previous techniques.

In an example, multiple-instance learning utilizes the discriminative information at the instance level based on the assumption that the instances related to the positive class in a binary classification problem exist only in positive bags. In the content of the present application, a video track is considered a bag and the ROIs are considered the instances. The positive class of a model is the appearance of a particular person, and instances of the particular person exist only in positive bags.

In some embodiments, a binary classification model $f(\vec{x})$ defined in instance space $R^d$ is learned, where $x \in R^d$. The model that classifies a video track (or bag) may be $F(X)=\varphi(f(\vec{x}))$, where X is a video track and $\varphi(.)$ is a function aggregating the output of $f(\vec{x})$ given the instances $\vec{x} \in X$. The aggregation function $\varphi(.)$ can be defined following two different assumptions: the standard multiple instance (SMI) assumption, and the collective assumption.

The SMI assumption assumes that a positive bag (e.g. video track) includes at least one positive instance (e.g. at least one ROI containing a particular person) and a negative bag (e.g. video track) contains no positive instances (e.g. no ROIs containing the particular person). Therefore, the aggregation function may be defined such that F(X) can detect the instances (ROIs) that make a bag (video track) positive. If $f(\vec{x}) \in [0,1]$, $F(X)=\max_{\vec{x} \in X} f(\vec{x})$. If $f(\vec{x}) \in \{0,1\}$, $F(X)=\Lambda_{\vec{x} \in X} f(\vec{x})$.

The collective assumption assumes that all the [positive?] instances in a positive bag are related to the positive class (e.g. all positive ROIs within the bag contain an image of the particular person), either explicitly or implicitly. Hence, the aggregation function based on this assumption utilizes the output of $f(\vec{x})$ on all instances (ROIs) of a new bag (video track). As an example, $F(X)=1/|X|\Sigma_{\vec{x} \in X} f(\vec{x})$. There are several options for the instance level classification model $f(\vec{x})$, such as Axis-Parallel-Rectangle, Multiple Instance Support Vector Machines (MI-SVM), and sparse MIL (SMIL).

Referring back to FIG. 13, it should be appreciated that any video track which is assigned a label at block 1330 would be a positive bag for the person to whom the label corresponds. For example, a video track given the label of "Jim Brown" would be a positive bag for Jim Brown. It should also be appreciated that a given video track can contain ROIs of more than one person and consequently a video track can be given more than one label, and can be a positive bag for more than one person. As noted above, in some embodiments, a video track is only given one label, which corresponds to the identity of the person who appears most frequently in that video track.

Once a visual similarity model has been trained for each person, there will be D models, where D is the number of people under consideration. When the visual similarity module 140 receives a new video track, the new video track will be compared with D binary classification models $F_k(X)$, where k=1, 2, . . . , D. The visual similarity module 140 then outputs a ranking for each particular person based on $F_k(X)$, which indicates the likelihood that the video track contains images of the particular person. The visual similarity module may also make a decision directly according to $\hat{K}=\text{argmax}_k F_k(X)$.

The concepts described herein may be useful in implementing an automated visual search system. The concepts described herein reduce the burden on users searching through a video for an object of interest. Previously, users were required to undertake tedious and time-consuming tasks such as manually looking through a video for the object of interest. Similarly, former systems that required users to provide a large amount of training data collected through time-consuming manual annotation were also impractical and of little value. This was especially the case where users needed fast results or could not invest the time and effort required to undertake manual annotation.

The systems and methods described herein for applying multiple instance learning to video-based object searching can reduce the time needed for annotating large scale training data sets. These large scale annotated training data sets can then be used to machine-learn a binary classifier for each person for which annotated data exists.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufactures, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufactures, compositions of matter, means, methods or steps.

As can be understood, the examples above and illustrated are intended to be exemplary only. The invention is defined by the appended claims.

What is claimed is:

1. A method of training an image recognition tool for detecting images of a person:
   scanning a first frame in a video stream comprising a sequence of frames for images of a person;
   generatinq a representation of the region of interest of the first frame likely to contain the image of the person;
   forming a video track comprising the representation of a region of interest of the first frame likely to contain an image of the person;
   scanning each subsequent frame in the sequence of frames for images of the person in each subsequent frame, wherein the scanning each frame begins at a location in each frame based on a location of the region of interest of a preceding frame;
   for each subsequent frame in the sequence of frames:
      generating a representation of the region of interest of the subsequent frame likely to contain the image of the person;
      adding, to the video track, the representation of a region of interest of subsequent frame likely to contain the image of the person;
   assigning a positive label to the video track when the representation of the region of interest in at least one of the first frame and the subsequent frames contains the person and no other people, the positive label identifying the video track as corresponding to the person; and designating each representation of the region of interest in the positively labeled video track as a positive instance and providing each representation of the region of interest in the positively labeled video track to the image recognition tool for training a multiple-instance learning algorithm of the image recognition tool.

2. The method of claim 1, wherein the representation of the region of interest of the first frame comprises a set of coordinates indicating a position and dimensions of the region of interest.

3. The method of claim 1, wherein the representation of the region of interest of the first frame comprises image data extracted from the region of interest of the first frame.

4. The method of claim 1, further comprising:
prior to the assigning, displaying the video track on a display device.

5. The method of claim 1, wherein a number of frames containing the person in the labelled video track is less than a total number of frames in the labelled video track.

6. The method of claim 1, wherein the scanning the first frame comprises analyzing pixel data.

7. The method of claim 6, wherein the analyzing comprises computing metadata based on said pixel data.

8. The method of claim 1, wherein the scanning the first frame comprises:
analyzing a portion of the first frame contained within a sliding window; and
determining a probability that the portion contains an image of the person.

9. The method of claim 1, further comprising assigning a negative label to the video track when any of the first frame and the subsequent frames do not contain the person and no other people.

10. The method of claim 9, further comprising designating each representation of the region of interest in the negatively labeled video track as a negative instance and providing each representation of the region of interest in the negatively labeled video track to the image recognition tool for training the multiple-instance learning algorithm of the image recognition tool.

11. The method of claim 1, comprising receiving a second video track, assigning a positive label to the second video track when the representation of the region of interest in at least one of the first frame and the subsequent frames of the second track contains the person and no other people, the positive label identifying the second video track as corresponding to the person, and designating each representation of the region of interest in the second positively labeled video track as a positive instance and providing each representation of the region of interest in the second positively labeled video track to the image recognition tool for training the multiple-instance learning algorithm of the image recognition tool.

12. The method of claim 11, wherein the second video track is formed by:
scanning a first frame in a second video stream comprising a sequence of frames for images of the person;
generating a representation of the region of interest of the first frame in the second video stream likely to contain the image of the person;
forming the second video track, comprising the representation of a region of interest of the first frame likely to contain an image of the person;
scanning each subsequent frame in the sequence of frames for images of the person in each subsequent frame, wherein the scanning each frame begins at a location in each frame based on a location of the region of interest of a preceding frame; and
for each subsequent frame in the second sequence of frames:
generating a representation of the region of interest of the subsequent frame likely to contain the image of the person; and
adding, to the second video track, the representation of a region of interest of the subsequent frame likely to contain the image of the person.

13. A system for training an image recognition tool for detecting images of a person, the system comprising:
a processor;
a memory containing computer-readable instructions for execution by said processor, said instructions comprising:
video analytics instructions for producing a video track, the video analytics instructions comprising:
human body detection instructions for scanning image data in a video stream comprising a sequence of frames for a person and generating representations of regions of interest of frames in the sequence of frames likely to contain the image of the person;
visual feature extraction instructions for adding, to the video track, representations of regions of interest of the sequence of frames likely to contain the person;
human body tracking instructions for determining a starting location for said scanning in frames of said sequence based on a location of a region of interest in a preceding frame;
labeling instructions for assigning a positive label to the video track when the representation of the region of interest in at least one of the first frame and the subsequent frames contains the person and no other people, the positive label identifying the video track as corresponding to the person;
training instructions for designating each representation of the region of interest in the positively labeled video track as a positive instance and providing each representation of the region of interest in the positively labeled video track to the image recognition tool for training a multiple-instance learning algorithm of the image recognition tool; and
a storage for storing the positively labeled video track and the trained image recognition tool.

14. The system of claim 13, wherein the representations of the regions of interest comprise a set of coordinates indicating a position and dimensions of the region of interest.

15. The system of claim 13, wherein the representation of the region of interest comprises an image of the region of interest extracted from a frame.

16. The system of claim 13, further comprising:
a display device for displaying the video track prior to labelling the video track.

17. The system of claim 13, wherein a number of frames containing the particular person in the labelled video track is less than a total number of frames in the labelled video track.

18. The system of claim 13, wherein the scanning comprises analyzing pixel data.

19. The system of claim 18, wherein the analyzing comprises computing metadata based on the pixel data.

20. The system of claim 13, wherein the scanning the first frame comprises:

analyzing the image data contained within a sliding window; and determining a probability that the sliding window contains the person.

21. The system of claim 13, wherein said video analytics instructions further comprise further labeling instructions for assigning a negative label to the video track when any of the first frame and the subsequent frames do not contain the person and no other people.

22. The system of claim 21, wherein said video analytics instructions further comprise further training instructions for designating each representation of the region of interest in the negatively labeled video track as a negative instance and providing each representation of the region of interest in the negatively labeled video track to the image recognition tool for training the multiple-instance learning algorithm of the image recognition tool.

23. The system of claim 13, wherein said video analytics instructions further comprises:

further video analytics instructions for producing a second video track, the further video analytics instructions comprising:

further human body detection instructions for scanning image data in a second video stream comprising a sequence of frames for a person and generating representations of regions of interest of frames in the sequence of frames likely to contain the image of the person;

further visual feature extraction instructions for adding, to the second video track, representations of regions of interest of the sequence of frames likely to contain the person;

further human body tracking instructions for determining a starting location for said scanning in frames of said sequence based on a location of a region of interest in a preceding frame;

further labeling instructions for assigning a positive label to the second video track when the representation of the region of interest in at least one of the first frame and the subsequent frames contains the person and no other people, the positive label identifying the second video track as corresponding to the person;

further training instructions for designating each representation of the region of interest in the positively labeled second video track as a positive instance and providing each representation of the region of interest in the positively labeled second video track to the image recognition tool for training a multiple-instance learning algorithm of the image recognition tool.

24. A non-transitory computer-readable storage medium having stored thereon computer-executable instructions that, when executed by one or more processors, cause the one or more processors to perform a method of training an image recognition tool for detecting images of a person, the method comprising:

scanning a first frame in a video stream comprising a sequence of frames for images of a person;

generating a representation of the region of interest of the first frame likely to contain the image of the person;

forming a video track comprising the representation of a region of interest of the first frame likely to contain an image of the person;

scanning each subsequent frame in the sequence of frames for images of the person, wherein the scanning each frame begins at a spatial location in each frame based on a location of the region of interest of a preceding frame;

for each subsequent frame in the sequence of frames:

generating a representation of the region of interest of the subsequent frame likely to contain the image of the person;

adding, to the video track, the representation of a region of interest of the subsequent frame likely to contain the image of the person;

assigning a positive label to the video track when the representation of the region of interest in at least one of the first frame and the subsequent frames contains the person and no other people, the positive label identifying the video track as corresponding to the person; and designating each representation of the region of interest in the positively labeled video track as a positive instance and providing each representation of the region of interest in the positively labeled video track to the image recognition tool for training a multiple-instance learning algorithm of the image recognition tool.

* * * * *